(12) United States Patent
Khan

(10) Patent No.: US 10,803,617 B2
(45) Date of Patent: Oct. 13, 2020

(54) METHOD AND SYSTEM FOR DETECTING AND CORRECTING AN ORIENTATION OF AN IMAGE

(71) Applicant: Wipro Limited, Bangalore (IN)

(72) Inventor: Ghulam Mohiuddin Khan, Bangalore (IN)

(73) Assignee: Wipro Limited, Bangalore (IN)

( * ) Notice: Subject to any disclaimer, the term of this patent is extended or adjusted under 35 U.S.C. 154(b) by 244 days.

(21) Appl. No.: 15/938,792

(22) Filed: Mar. 28, 2018

(65) Prior Publication Data
US 2019/0295289 A1 Sep. 26, 2019

(30) Foreign Application Priority Data

Mar. 21, 2018 (IN) .............................. 201841010409

(51) Int. Cl.
| | |
|---|---|
| G06K 9/62 | (2006.01) |
| G06T 7/73 | (2017.01) |
| G06K 9/00 | (2006.01) |
| G06N 3/04 | (2006.01) |
| G06N 3/08 | (2006.01) |
| G06T 3/60 | (2006.01) |
| G06K 9/32 | (2006.01) |

(52) U.S. Cl.
CPC ............ G06T 7/75 (2017.01); G06K 9/00979 (2013.01); G06K 9/32 (2013.01); G06K 9/6232 (2013.01); G06N 3/04 (2013.01); G06N 3/08 (2013.01); G06T 3/60 (2013.01); G06T 2207/20084 (2013.01)

(58) Field of Classification Search
CPC ... G06T 7/75; G06T 3/60; G06T 2207/20084; G06K 9/32; G06K 9/6232; G06K 9/00979; G06N 3/08; G06N 3/04

USPC .......................................................... 382/157
See application file for complete search history.

(56) References Cited

U.S. PATENT DOCUMENTS

| | | |
|---|---|---|
| 6,915,025 B2 | 7/2005 | Wang et al. |
| 7,215,828 B2 | 5/2007 | Luo |
| 7,844,135 B2 | 11/2010 | Steinberg et al. |
| 2006/0204110 A1 | 9/2006 | Steinberg et al. |

(Continued)

OTHER PUBLICATIONS

Luo, Jiebo, and Matthew Boutell. "Automatic image orientation detection via confidence-based integration of low-level and semantic cues." IEEE Transactions on Pattern Analysis and Machine Intelligence 27.5 (2005): 715-726. (Year: 2005).*

*Primary Examiner* — Andrew M Moyer
(74) *Attorney, Agent, or Firm* — Finnegan, Henderson, Farabow, Garrett & Dunner, LLP

(57) ABSTRACT

This disclosure relates to method and system for detecting and correcting an orientation of an image. The method may include generating a number of images of an environment corresponding to the input image, determining a region and a label corresponding to each of a number of objects in each of the images, determining a context for each of the objects in each of the images with respect to an overall context of the environment based on the label for each of the objects, estimating an orientation score for each of the images based on a correlation between the region and the label of each of the objects in each of the images and the context of each of the objects in each of the images, and correcting the orientation of the input image based on the estimated orientation score for each of the images.

20 Claims, 7 Drawing Sheets

(56) References Cited

U.S. PATENT DOCUMENTS

2017/0236287 A1* 8/2017 Shen .................... G06K 9/6269
                                                      382/206
2019/0164290 A1* 5/2019 Wang ....................... G06T 7/10

* cited by examiner

METHOD AND SYSTEM FOR DETECTING AND CORRECTING AN ORIENTATION OF AN IMAGE

This application claims the benefit of Indian Patent Application Serial No. 201841010409, filed Mar. 21, 2018 which is hereby incorporated by reference in its entirety.

FIELD

This disclosure relates generally to image processing, and more particularly to method and system for detecting and correcting an orientation of an image.

BACKGROUND

Digital devices with image capturing capability, including, for example, digital camera, smart phones, mobile phones, tablets, laptops, computers, and other computing devices, have become ubiquitous in recent years. Typically, the images may be captured in different orientations using such digital devices. For example, the images may be captured as 'portrait' or 'landscape' orientations. The 'portrait' orientation is where the height of the image is greater than the width, while the 'landscape' orientation is where the width of the image is greater than the height. Further, in certain scenarios, a user may capture an image in a tilted orientation (for example, at 30 degree) so as to cover the scene and details in which the user is interested. The captured images may be stored in the digital device for later viewing. However, at a later point of time, if the user needs to view the images then it may not be comfortable to view the images in their current orientation. It is important that the captured images may be oriented correctly so as to best view the captured scene in the image.

Existing techniques may enable the user to manually rotate/transform the images (for example, at pre-defined degrees) so as to better view the images. However, such manual correction of orientation may be annoying and imprecise. Further, existing techniques may provide for automatic identification or determination of an orientation of image using one or more features (for example, chrominance, luminance, edges, straight lines, facial information, and so forth) extracted from the image. However, these techniques are dependent on presence of orientation sensitive objects or lines to estimate the orientation. Thus, existing techniques for automatic detection and correction of the orientation of the image are limited in their effectiveness, robustness, and efficiency.

SUMMARY

In one embodiment, a method for correcting an orientation of an input image is disclosed. In one example, the method may include generating a set of images of an environment corresponding to the input image. The method may further include determining a region and a label corresponding to each of one or more objects in each of the set of images using an object detection and labelling model. The method may further include determining a context for each of the one or more objects in each of the set of images with respect to an overall context of the environment, using a context generation model, based on the label for each of the one or more objects. The method may further include estimating an orientation score for each of the set of images based on a correlation between the region and the label of each of the one or more objects in each of the set of images, and the context of each of the one or more objects in each of the set of images. The method may further include correcting the orientation of the input image based on the estimated orientation score for each of the set of images.

In one embodiment, a system for correcting an orientation of an input image is disclosed. In one example, the system may include at least one processor and a memory communicatively coupled to the at least one processor. The memory may store processor-executable instructions, which, on execution, may cause the processor to generate a set of images of an environment corresponding to the input image. The processor-executable instructions, on execution, may further cause the processor to determine a region and a label corresponding to each of one or more objects in each of the set of images using an object detection and labelling model. The processor-executable instructions, on execution, may further cause the processor to determine a context for each of the one or more objects in each of the set of images with respect to an overall context of the environment, using a context generation model, based on the label for each of the one or more objects. The processor-executable instructions, on execution, may further cause the processor to estimate an orientation score for each of the set of images based on a correlation between the region and the label of each of the one or more objects in each of the set of images, and the context of each of the one or more objects in each of the set of images. The processor-executable instructions, on execution, may further cause the processor to correct the orientation of the input image based on the estimated orientation score for each of the set of images.

In one embodiment, a non-transitory computer-readable medium storing computer-executable instructions for correcting an orientation of an input image is disclosed. In one example, the stored instructions, when executed by a processor, may cause the processor to perform operations including generating a set of images of an environment corresponding to the input image. The operations may further include determining a region and a label corresponding to each of one or more objects in each of the set of images using an object detection and labelling model. The operations may further include determining a context for each of the one or more objects in each of the set of images with respect to an overall context of the environment, using a context generation model, based on the label for each of the one or more objects. The operations may further include estimating an orientation score for each of the set of images based on a correlation between the region and the label of each of the one or more objects in each of the set of images, and the context of each of the one or more objects in each of the set of images. The operations may further include correcting the orientation of the input image based on the estimated orientation score for each of the set of images.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
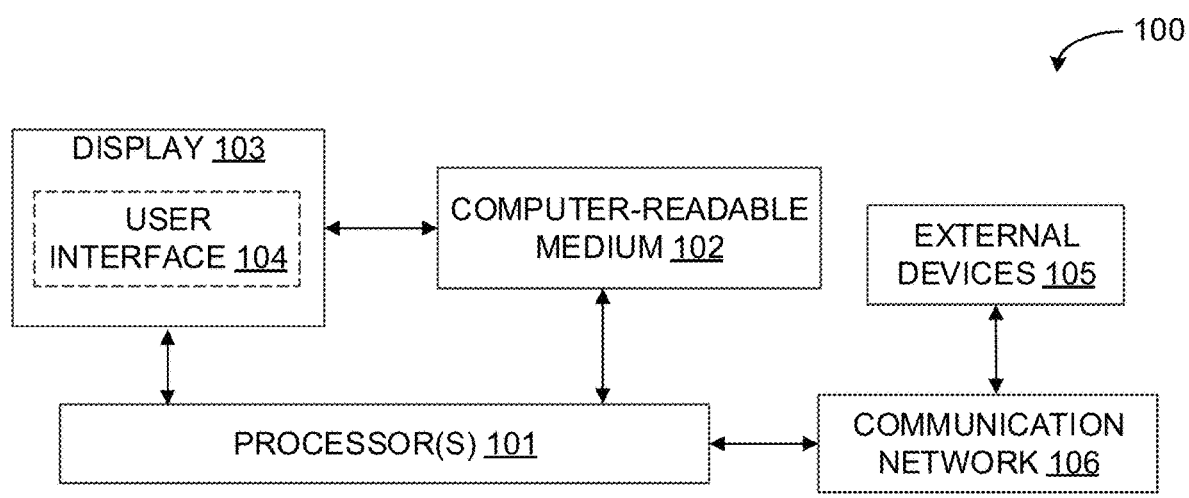
FIG. 1 is a block diagram of an exemplary system for detecting and correcting an orientation of an image in accordance with some embodiments of the present disclosure.

Referring now to FIG. 1, an exemplary system 100 for detecting and correcting an orientation of an image is illustrated in accordance with some embodiments of the present disclosure. The system 100 may include a computing device having an image processing capability. In some embodiments, the computing device may also have an image capturing capability. For example, the system 100 may include, but may not be limited to, server, desktop, laptop, notebook, netbook, tablet, smartphone, mobile phone, and digital camera. In particular, the system 100 implements an image processing device so as to detect and correct the orientation of the image. As will be described in greater detail in conjunction with FIGS. 2-7, the imaging device may generate a set of images of an environment corresponding to an input image, determine a region and a label corresponding to each of one or more objects in each of the set of images using an object detection and labelling model, and determine a context for each of the one or more objects in each of the set of images with respect to an overall context of the environment based on the label for each of the one or more objects using a context or language generation model. The image processing device may then estimate an orientation score for each of the set of images based on a correlation between the region and the label of each of the one or more objects in each of the set of images, and the context of each of the one or more objects in each of the set of images. The image processing device may further correct an orientation of the input image based on the estimated orientation score for each of the set of images.

The system 100 may include one or more processors 101, a computer-readable medium (e.g., a memory) 102, and a display 103. The computer-readable storage medium 102 may store instructions that, when executed by the one or more processors 101, cause the one or more processors 101 to detect and correct the orientation of the image in accordance with aspects of the present disclosure. The computer-readable storage medium 102 may also store various data (e.g., training images, annotated objects and region bounds in the training images, rotated images corresponding to the training images, object detection and labelling model, textual description for the training images, object labels for the training images, context or language generation model, input image, set of images derived from the input image, objects in the set of images, object labels and region bounds for the objects, context for the objects, orientation scores, etc.) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
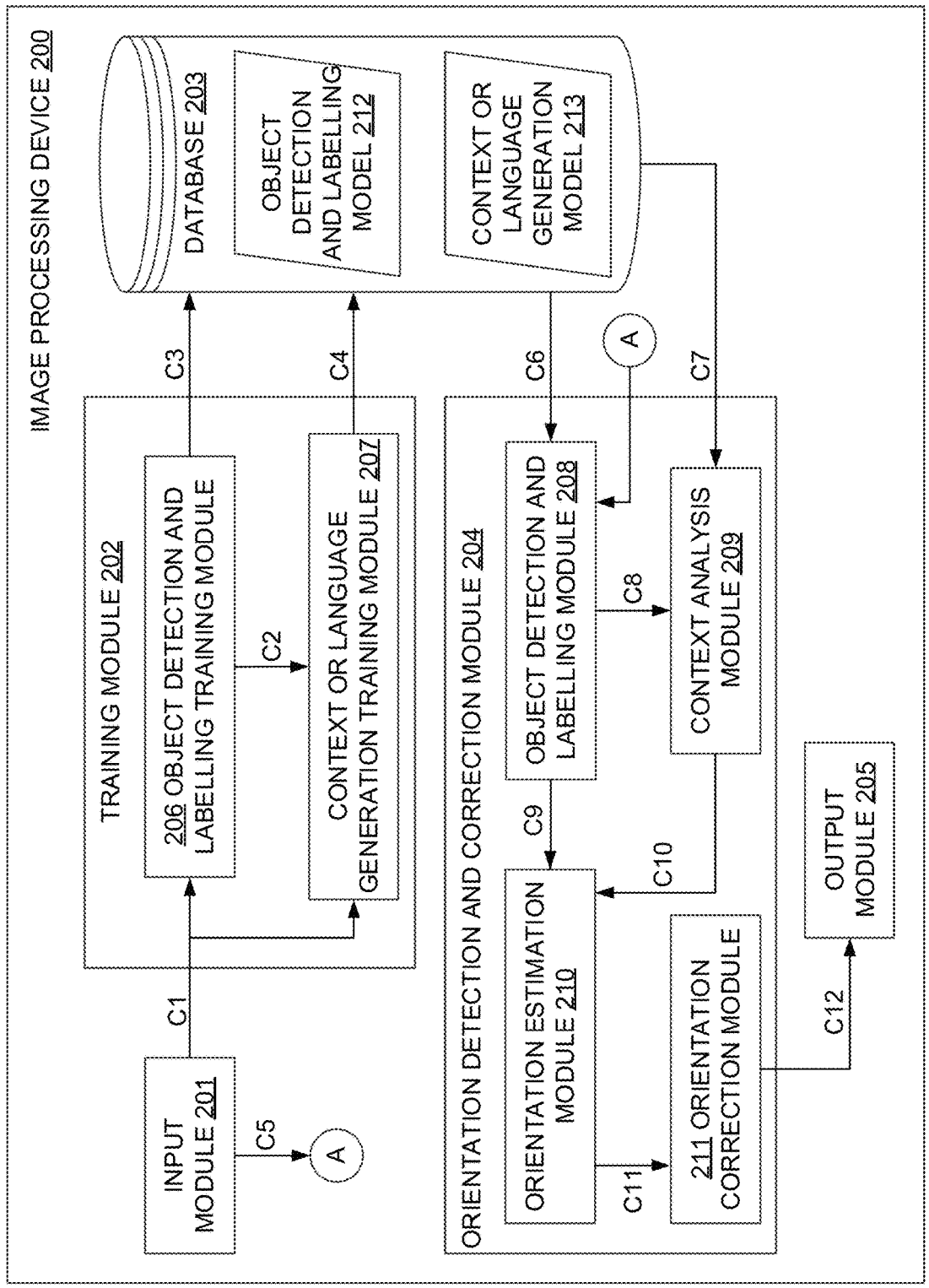
FIG. 2 is a functional block diagram of an image processing device, implemented by the system of FIG. 1, in accordance with some embodiments of the present disclosure.

Referring now to FIG. 2, a functional block diagram of the image processing device 200, implemented by the system 100 of FIG. 1, is illustrated in accordance with some embodiments of the present disclosure. The image processing device 200 may include various modules that perform various functions so as to perform detection and correction of the orientation of the input image. In some embodiments, the image processing device 200 may include an input module 201, a training module 202, a database 203, an orientation detection and correction module 204, and an output module 205. Additionally, in some embodiments, the training module 202 may further include an object detection and labelling training module 206 and a context or language generation training module 207. Further, in some embodiments, the object detection and correction module 204 may further include an object detection and labelling module 208, a context analysis module 209, an orientation estimation module 210, and an orientation correction module 211. As will be appreciated by those skilled in the art, all such aforementioned modules and the database 201-211 may be represented as a single module or a combination of different modules. Moreover, as will be appreciated by those skilled in the art, each of the modules and the database 201-211 may reside, in whole or in parts, on one device or multiple devices communicatively coupled with each other.

The input module 201 may receive training image data from a user or from another device during a training phase. The training image data may include training images along with annotated objects (that is, object labels) and their region bounds (that is, bounding boxes containing the annotated objects). The input module 201 may then provide the training image data to the training module 202 for building and training an object detection and labelling model 212 and a context or language generation model 213. Additionally, the input module 201 may receive input image from a user or from another device during an operational phase. As will be appreciated, in some embodiments, the input image may be captured by the user via the system 100. The input module 201 may further provide the input image to the orientation detection and correction module 204, which may employ the trained models 212 and 213 for detecting and correcting the orientation of the input image.

The training module 202 may receive the training image data from the input module 201, and build and train the object detection and labelling model 212 and the context or language generation model 213. In particular, the object detection and labelling training module 206 may receive the training image data (that is, training images along with the object labels and their region bounds) from the input module 201 via a connection C1. The object detection and labelling training module 206 may then train a convolution neural network based machine learning model as the object detection and labelling model 212 so as to detect regions comprising objects and to label the detected objects in the images. In some embodiments, upon receiving the training images along with their object labels and region bounds, the object detection and labelling training module 206 may rotate each of the training image into different orientations (for example, 90 degree, 180 degree, 270 degree, etc.). Further, in some embodiments, the different orientations may be predefined. It should be noted that, upon rotation of a training image, the object regions in that training image may be transformed. The rotated images along with transformed object regions corresponding to each of the training images may be stored in the database 203. The training image data and the derived training image data (that is, rotated images along with transformed object regions for each of the training images) may then be employed for training the object detection and labelling model 212. As will be appreciated, the trained object detection and labelling model 212 may be stored in the database 203 and may be employed to determine object labels and region bounds in the images during operational phase.

Further, the context or language generation training module 207 may receive the training image data (that is, training images along with textual descriptions) from the input module 201 via a connection C1, and the detected object labels in the training images from the object detection and labelling training module 206 via a connection C2. The context or language generation training module 207 may then train a deep learning based machine learning model as the context or language generation model 213 so as to determine context in the input image. In particular, the training images with textual descriptions and the object labels may be employed to train the context or language generation model 213, which may learn to associate the object regions with labels and texts in textual description. Thus, the context or language generation model 213 may learn to correlate the objects available in the image using the object labels, and to generate the overall global context of the image as the textual description. Again, as will be appreciated, the trained context or language generation model 213 may be stored in the database 203 and may be employed to provide textual description of the context in the images during operational phase.

The database 203 may receive the trained object detection and labelling model 212 from the object detection and labelling training module 206 via a connection C3, and the trained context or language generation model 213 from the context or language generation training module 207 via a connection C4. The trained models 212 and 213 may then be stored in the database 203, and may be employed for detecting and correction the orientation of the input image during the operational phase.

The orientation detection and correction module 204 may receive the input image from the input module 201, and detect and correct the orientation of the input image using the object detection and labelling model 212 and the context or language generation model 213. In particular, the object detection and labeling module 208 may receive the input image from the input module 201 via a connection C5. The object detection and labeling module 208 may then generate a set of images from the input image. It should be noted that each of the set of images may encompass an environment depicted in the input image. In some embodiments, the set of images may be derived from the input image by orientating the input image in different and unique orientations. For example, in some embodiments, the different and unique orientations may be provided by N*(Pi/2) where N=1, 2, 3, and so on. Thus, the set of images may be generated by orientating the input image at, but not limited to, 90 degree, 180 degree, 270 degree, and so forth. As will be appreciated, in some embodiments, the different orientations may include a portrait orientation and a landscape orientation. It should be noted that the set of images may therefore include the input image and the derived images (that is, the rotated images).

The object detection and labeling module 208 may also receive the object detection and labelling model 212 from the database 203 via a connection C6. The object detection and labeling module 208 may then detect and label one or more objects in each of the set of images using the object detection and labelling model 212. In some embodiments, the generated object labels and region bounds for each of the set of images along with the respective image may be stored in the database 203 for subsequent reference by the orientation estimation module 210. It should be noted that, in some embodiments, the object detection and labeling module 208 may filter out filtering inconsistent objects from among the detected objects in the set of images. In other words, in some embodiments, the object detection and labeling module 208 may select and store only consistent objects, occurring across the set of images (that is, the input image and the set of derived images), along with their labels and region bounds.

The context analysis module 209 may receive the context or language generation model 213 from the database 203 via a connection C7. Further, the context analysis module 209 may receive the input image and the set of images along with the detected object labels and region bounds from the object detection and labeling module 208 via a connection C8. It should be noted that, in some embodiments, the context analysis module 209 may receive object labels and region bounds for consistent objects within the input image and the set images. The context analysis module 209 may then generate a context for each of the set of images, in the form of a textual description, using the context or language generation model 213 by correlating the object labels detected in the image.

The orientation estimation module 210 may receive the set of images along with their object labels and region bounds from the object detection and labeling module 208 via a connection C9. Further, the orientation estimation module 210 may receive the textual descriptions (that is, context) of each of the set of images from the context analysis module 209 via a connection C10. The orientation estimation module 210 may then estimate an orientation score for each of the set of images based on corresponding context, object labels, and the region bounds. In particular, the orientation estimation module 210 may compute the orientation score by correlating the region bounds and the object labels, and the context. Thus, for example, the orientation score may be high for an image in which the object labels and their region or location bounds are in accord or in synchronization with the context of that image.

In some embodiments, the orientation and the region bound of an object in an image with respect to orientations and region bounds of other objects in the image and the overall global context may be used to estimate the orientation score of the image. Further, in some other embodiments, a machine learning model may be built and trained as an orientation score estimation model so as to assign a probabilistic orientation score based on orientations and positions (that is region bounds) of the objects in the input image (that is, original image assumed to be in correct orientation for viewing) and the set of derived images (that is, rotated images). As will be appreciated, the learning optimization may be such that the orientation score estimation model may learn to predict and assign highest score for correct orientation and lesser for others. Moreover, in some other embodiments, the orientation score for an image may be computed based on heuristics. In such embodiments, a heuristics based model may be trained for generating the orientation scores.

The orientation correction module 211 may receive the set of images along with their orientation scores from the orientation estimation module 210 via a connection C11. The orientation correction module 211 may then correct the orientation of the input image based on the estimated orientation scores for the set of images. In some embodiments, the orientation correction module 211 may determine one or more images from among the set of images having substantially correct orientations based on their orientation scores. For example, in some embodiments, a substantially higher orientation score may indicate a substantially correct orientation. Additionally, the orientation correction module 211 may transform or rotate the one or more images so as to correct the orientation for better viewing to the user. The orientation correction module 211 may then provide the image with correct orientation (that is, the one or more images having substantially correct orientations) or the image with corrected orientation (that is, the one or more images that are transformed and rotated) to the output module 205.

The output module may receive the image with the correct or corrected orientation from the orientation correction module 211 via a connection C12. The output module 205 may then render the image with correct orientation on the system. As will be appreciated, in some embodiments, rendering includes displaying the image with correct orientation on a screen of the system 100 for better viewing by the user.

As will be appreciated, each of the connections, C1-C12, may acquire or transfer images or data from one module or the database 201-211 to the other module or the database 201-211 using standard wired or wireless data connections means. For example, each of the connections, C1-C12, may employ one or more connection protocols including, but not limited to, serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, and PCIe.

By way of an example, the image processing device 200 described above may automatically detect and correct the orientation of an input image, based on objects detected in the input image and an overall context of the input image, for better viewing experience of the user. In particular, the image processing device 200 may estimate an orientation of the input image based on the objects detected in the input image and the overall context of the input image. The orientation scores for various orientations of the input image may be computed using a multimodal approach comprising of visual information (that is, object labels) as well as contextual information (that is, textual description). The correct orientation of the image may then be determined based on the estimated orientation scores.

As will be appreciated, unlike existing techniques, the image processing device 200 described above may analyze the context of the objects available in the received image so to detect and correct the orientation of the image. Further, as will be appreciated, the described image processing device may not dependent on the presence of orientation sensitive objects or lines so as to estimate the orientation.

It should be noted that the image processing device 200 may be implemented in programmable hardware devices such as programmable gate arrays, programmable array logic, programmable logic devices, or the like. Alternatively, the image processing device 200 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for detecting and correcting an orientation of an image. For example, the exemplary system 100 and the associated image processing device 200 may perform detection and correction of the orientation of the image by the processes discussed herein. In particular, as will be appreciated by those of ordinary skill in the art, control logic and/or automated routines for performing the techniques and steps described herein may be implemented by the system 100 and the associated image processing device 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
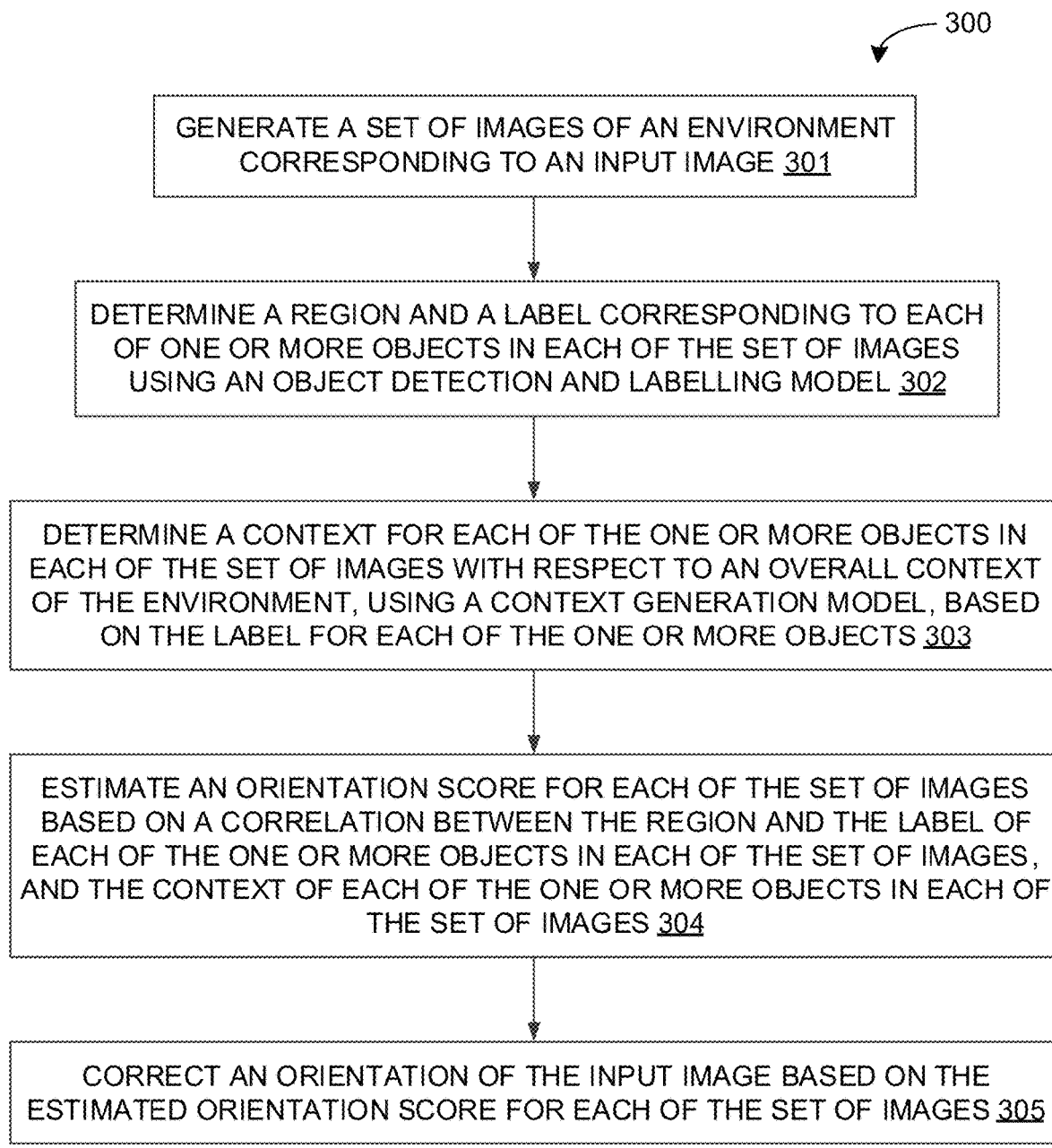
FIG. 3 is a flow diagram of an exemplary process for detecting and correcting an orientation of an image in accordance with some embodiments of the present disclosure.

For example, referring now to FIG. 3, exemplary control logic 300 for detecting and correcting an orientation of an image via a system, such as system 100, is depicted via a flowchart in accordance with some embodiments of the present disclosure. As illustrated in the flowchart, the control logic 300 may include the steps of generating a set of images of an environment corresponding to the input image at step 301, determining a region and a label corresponding to each of one or more objects in each of the set of images using an object detection and labelling model at step 302, and determining a context for each of the one or more objects in each of the set of images with respect to an overall context of the environment, using a context or language generation model, based on the label for each of the one or more objects at step 303. The control logic 300 may include the steps of estimating an orientation score for each of the set of images based on a correlation between the region and the label of each of the one or more objects in each of the set of images, and the context of each of the one or more objects in each of the set of images at step 304, and correcting the orientation of the input image based on the estimated orientation score for each of the set of images at step 305. In some embodiments, the control logic 300 may further include the step of filtering one or more inconsistent objects from among the one or more objects in the set of images. Further, it should be noted that, in some embodiments, each of the set of images of the environment may be oriented in a unique orientation.

In some embodiments, the object detection and labelling model may employ a convolution neural network based machine learning model. Additionally, in some embodiments, the control logic 300 may include the step of building the object detection and labelling model using training image data. It should be noted that, in such embodiments, the training image data may include a plurality of training images, one or more marked regions corresponding to one or more objects in each of the plurality of training images, and one or more labels corresponding to the one or more objects in each of the plurality of training images.

In some embodiments, the context or language generation model may employ a deep learning based machine learning model to associate a region and a label corresponding to an object to a textual description corresponding to that object. Additionally, in some embodiments, the control logic 300 may include the step of building the context or language generation model using training image data. It should be noted that, in such embodiments, the training image data may include a plurality of training images and a textual description for one or more objects in each of the plurality of training images.

In some embodiments, the orientation score of an object may be based on an orientation and a region of the object in an image with respect to orientations and regions of other objects in the image and an overall context of the environment. Additionally, in some embodiments, correcting the orientation of the input image may include determining one or more images from the set of images having substantially correct orientations based on the estimated orientation score for each of the set of images. Further, in such embodiments, correcting the orientation of the input image may include at least one of transforming or rotating the one or more images.

Figure 4:
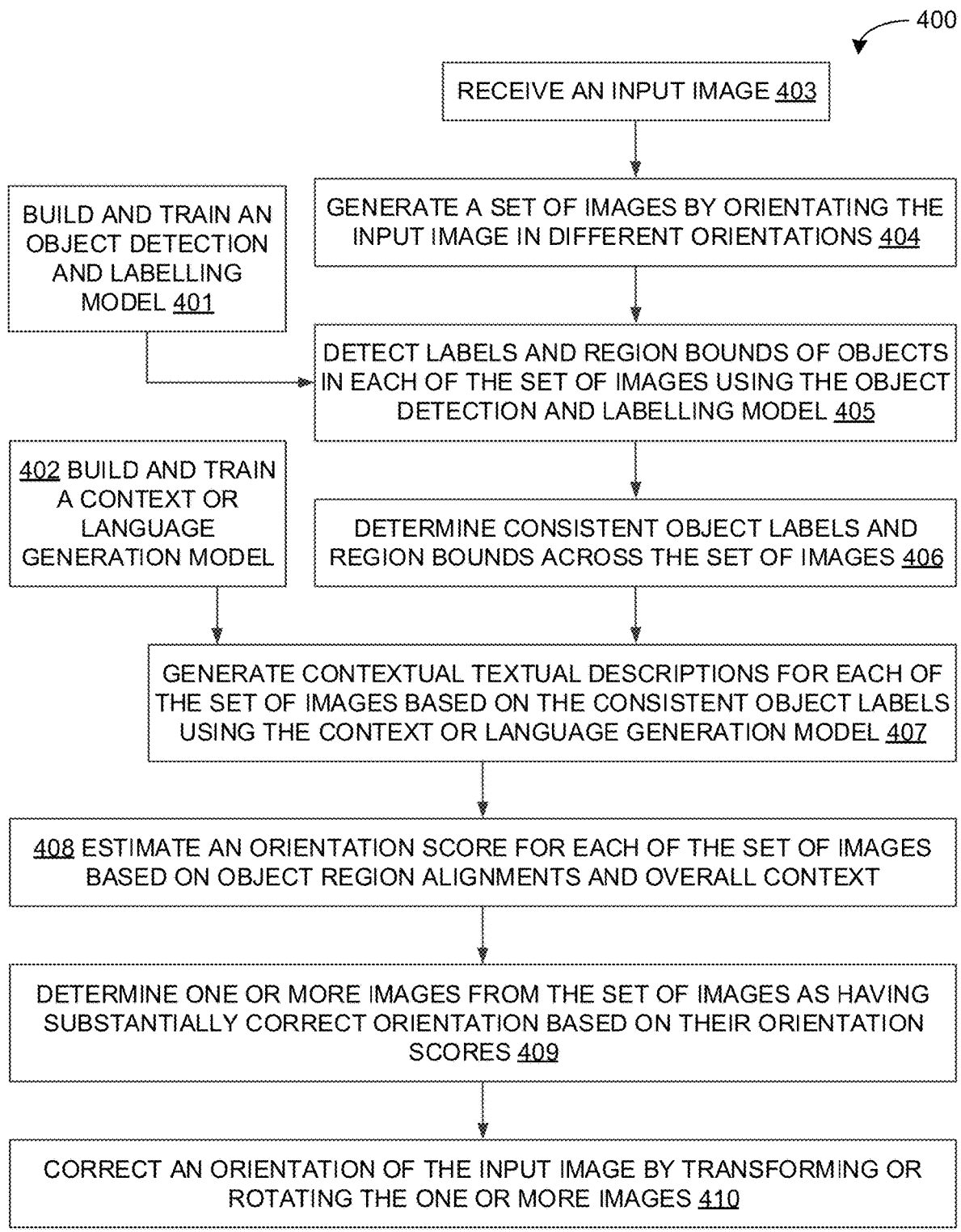
FIG. 4 is a flow diagram of a detailed exemplary process for detecting and correcting an orientation of an image in accordance with some embodiments of the present disclosure.
Figure 5:
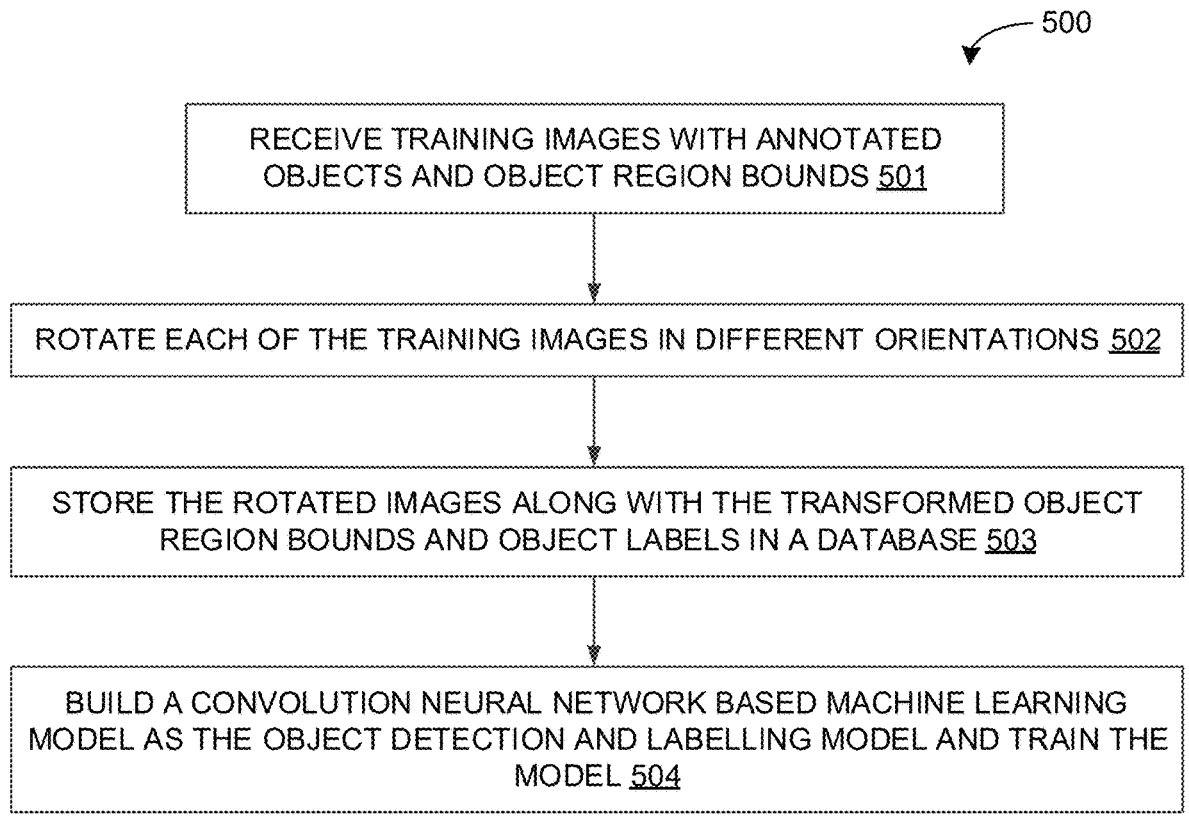
FIG. 5 is a flow diagram of a detailed exemplary process for building and training an object detection and labelling model in accordance with some embodiments of the present disclosure.

Referring now to FIG. 4, exemplary control logic 400 for detecting and correcting an orientation of an image based on available objects and contextual awareness is depicted in greater detail via a flowchart in accordance with some embodiments of the present disclosure. As illustrated in the flowchart, at step 401, the control logic 400 may build and train an object detection and labelling model. Referring now to FIG. 5, exemplary control logic 500 for building and training the object detection and labelling model is depicted via a flowchart in accordance with some embodiments of the present disclosure. As illustrated in the flowchart, at step 501, the control logic 500 may receive training image data, which may include a set of training images along with annotated objects (that is, object labels) and object region or location bounds. At step 502, the control logic 500 may rotate each of the training images in different orientations (for example: 90 degree, 180 degree, 270 degree, or the like). It should be noted that, in some embodiments, the different orientation may be pre-defined orientations. At step 503, the control logic 500 may store each of the rotated images along with the appropriate transformed object region or location bounds and appropriate object labels in the database. Further, at step 504, the control logic 500 may build a convolution neural network based machine learning model as the object detection and labelling model, and train the object detection and labelling model using the stored rotated images, the transformed object region or location bounds, and the object labels.

Figure 6:
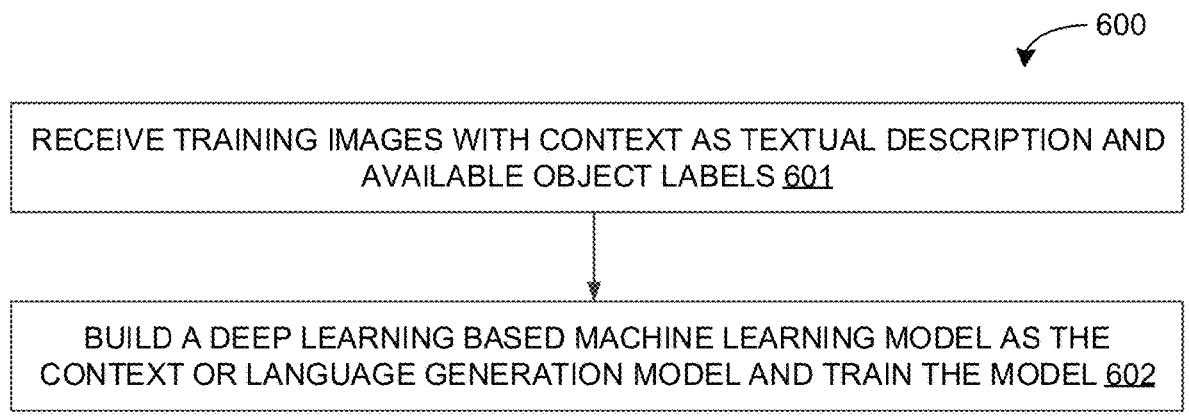
FIG. 6 is a flow diagram of a detailed exemplary process for building and training a context or language generation model in accordance with some embodiments of the present disclosure.

Referring back to FIG. 4, at step 402, the control logic 400 may build and train a context or language generation model. Referring now to FIG. 6, exemplary control logic 600 for building and training the context or language generation model is depicted via a flowchart in accordance with some embodiments of the present disclosure. As illustrated in the flowchart, at step 601, the control logic 600 may receive training image data, which may include a set of training images along with context as textual descriptions and available object labels. Further, at step 602, the control logic 600 may build a deep learning based machine learning model as the context or language generation model, and train the context or language generation model using the textual descriptions and the object labels.

Referring back to FIG. 4, at step 403, the control logic 400 may receive an input image. At step 404, the control logic 400 may generate a set of images by orientating the input image in different orientations (for example: 90 degree, 180 degree, 270 degree, or the like). It should be noted that, in some embodiments, the different orientation may be pre-defined and unique orientations. Further, at step 405, the control logic 400 may detect labels and region bounds of objects in each of the set of images (oriented in different orientations) using the object detection and labelling model (built and trained at step 401). Thus, the object labels and region bounds are detected for each orientation. At step 406, the control logic 400 may determine consistent object labels and region bounds across the set of images (that is, across the original input image and rotated images). As will be appreciated, the object labels and regions bounds consistent across the set of images may be retained for subsequent processing while the remaining may be filtered out or removed.

Further, at step 407, the control logic 400 may generate contextual textual descriptions for each of the set of images based on the consistent object labels using the context or language generation model (built and trained at step 402). It should be noted that the contextual textual descriptions may provide an overall context for the image. At step 408, the control logic 400 may estimate an orientation score for each of the set of images based on object region alignments in the image and overall context of the image. In some embodiments, the consistent object labels and region bounds in the image, and the context of the image may be correlated so as to determine an estimated orientation score of that image. At step 409, the control logic 400 may determine one or more images from among the set of images having substantially correct orientations based on their orientation scores. Additionally, at step 410, the control logic 400 may correct the orientation of the input image by transforming or rotating the one or more images.

Figure 7A:
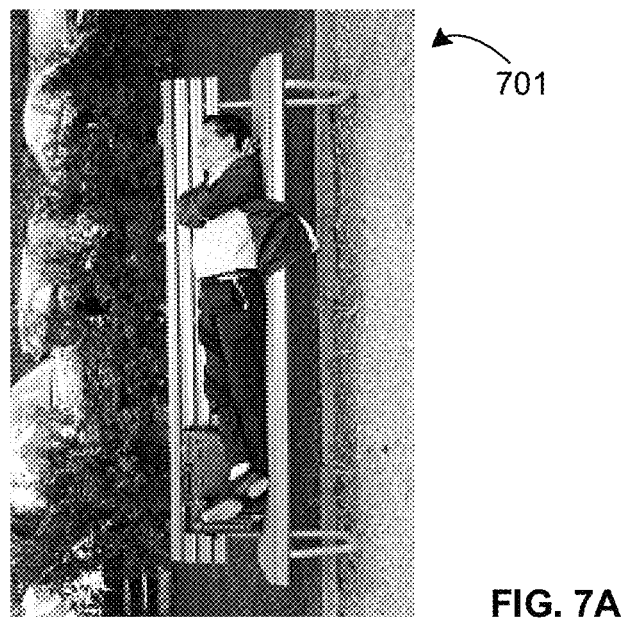
FIGS. 7A-7B illustrate an exemplary scenario for detecting and correcting an orientation of an image in accordance with some embodiments of the present disclosure.
Figure 7B:
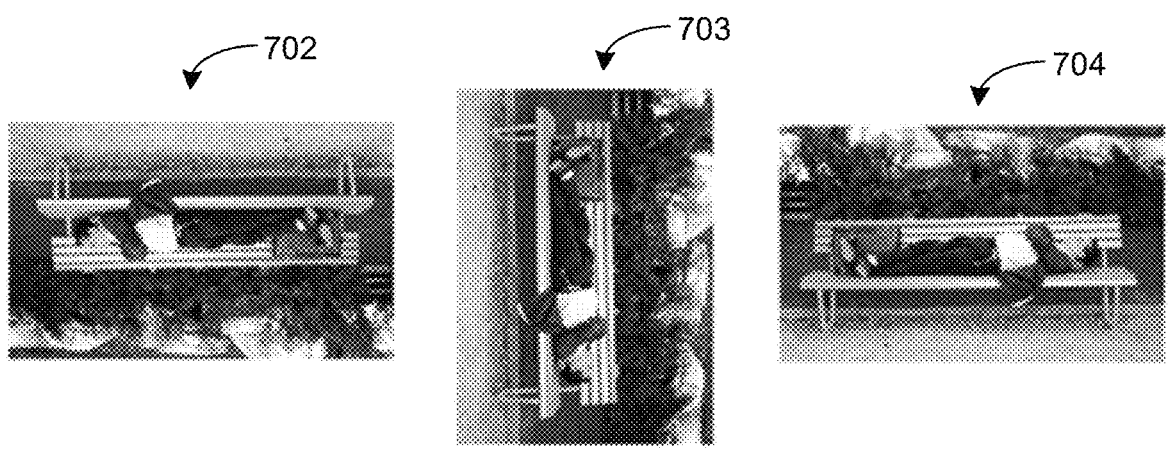

Referring now to FIGS. 7A-7B, an exemplary scenario for detecting and correcting an orientation of an image is illustrated in accordance with some embodiments of the present disclosure. In the exemplary scenario, the user may capture an image using a mobile phone. As illustrated in FIG. 7A, the capture image 701 may be of a person lying on a bench in a park. The captured image 701 may be then fed as an input image to the system 100 for detecting its current orientation and for correcting the detected orientation. After receiving the image 701, the system may generate a set of images in different orientations. For example, as illustrated in FIG. 7B, the system 100 may rotate the input image 701 into a number of pre-defined orientations, for example, 90 degree, 180 degree, and 270 degree, so as to generate a rotated images 702-704. The input image 701 and the rotated images 702-704 may form the set of images for subsequent processing.

The system 100 may then detect the object labels and region bounds for objects available in each of the set of images 701-704 using the object detection and labelling model. For example, the detect object labels may include, but may not be limited to, person lying, bench, grass, tress, park, or the like. It should be noted that the system 100 may consider those object labels which are consistent across the set of images 701-704. Further, the system 100 may use the detected object labels to determine an overall context for the set of images 701-704 using the context or language generation model. For example, the overall context for the set of images 701-704 may be 'a person lying on a bench in a park.'

The system 100 may then employ a heuristic based approach or a trained predictive model to assign an orientation score to each of the set of images 701-704 based on the overall context and the alignment of the detected object region bounds in the image. As will be appreciated, in some embodiments, the image with the correct alignment as per the generated context may be assigned with highest score. For example, the image 704 may be assigned with the highest score. Further, the system 100 may transform and rotate the input image 701, based on the image 704 having a substantially correct orientation, for better viewing. For example, the input image 701 may be rotated by 270 degrees as the image with the highest score 704 has the correct orientation (that is 270 degrees).

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
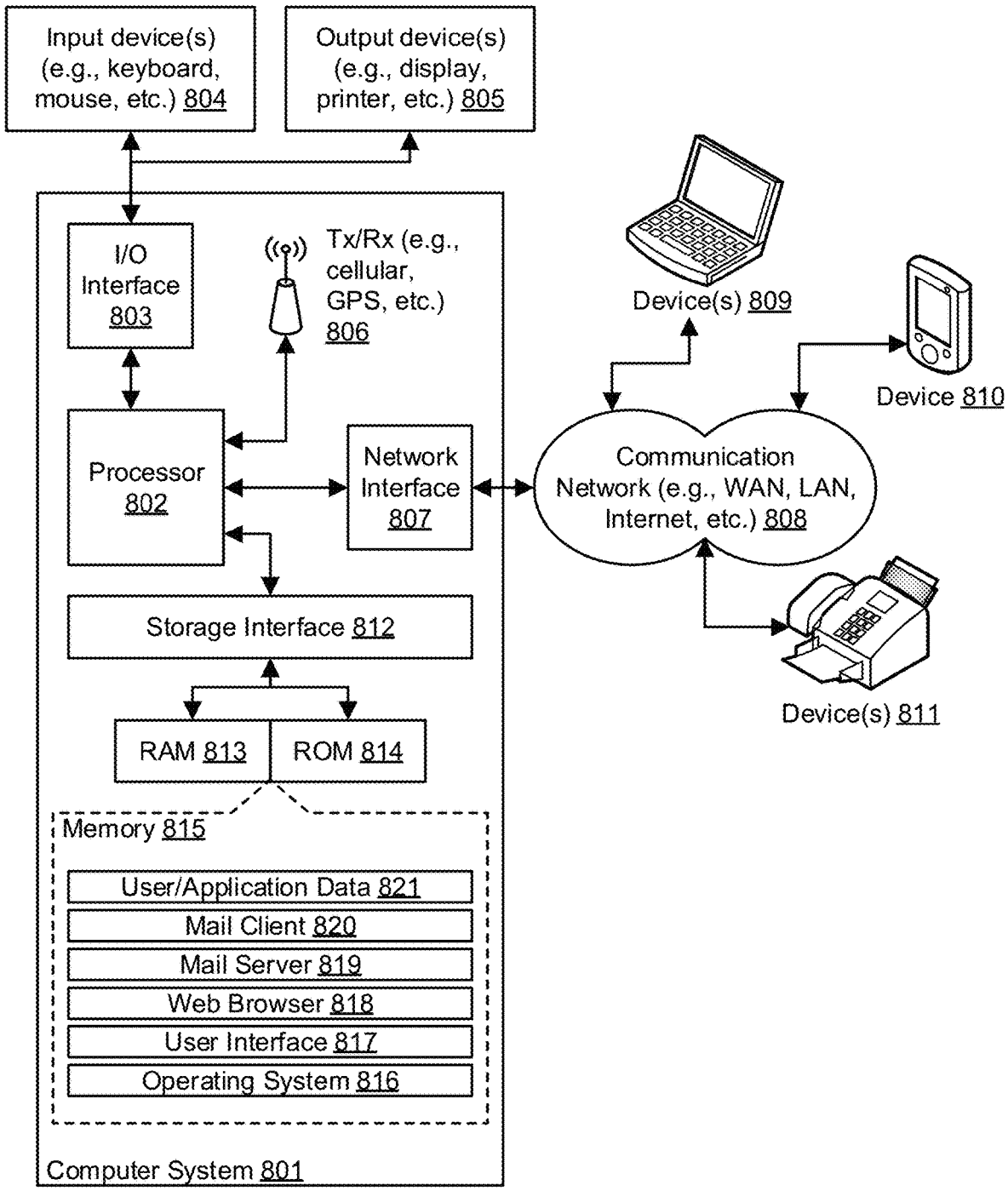
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, a block diagram of an exemplary computer system 801 for implementing embodiments consistent with the present disclosure is illustrated. Variations of computer system 801 may be used for implementing system 100 for detecting and correcting an orientation of an image. Computer system 801 may include a central processing unit ("CPU" or "processor") 802. Processor 802 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809, 810, and 811. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 801 may implement a mail server 819 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. (e.g., training images, annotated objects and region bounds in the training images, rotated images corresponding to the training images, object detection and labelling model, textual description for the training images, object labels for the training images, context or language generation model, input image, set of images derived from the input image, objects in the set of images, object labels and region bounds for the objects, context for the objects, orientation scores, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using Obj ectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide an effective, robust, and efficient mechanism for automatically detecting and correcting orientation of an image. In particular, the techniques provide for determining an orientation of each of a set of images derived from the input image, and correcting the orientation of the input image based on the determined orientation of each of the set of images. The techniques determine an orientation of an image based on a relationship between objects available in the image and overall context of the image. Thus, the techniques described in the various embodiments discussed above provide for automatically detecting and correcting the orientation of the image based on awareness of context with respect to the objects available in the image.

The specification has described method and system for detecting and correcting an orientation of an image. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of correcting an orientation of an input image, the method comprising:
    generating, by an image processing device, a set of images of an environment corresponding to the input image;
    determining, by the image processing device, a region and a label corresponding to each of one or more objects in each of the set of images using an object detection and labelling model;
    determining, by the image processing device, a context for each of the one or more objects in each of the set of images with respect to an overall context of the environment, using a context generation model, based on the label for each of the one or more objects;
    estimating, by the image processing device, an orientation score for each of the set of images based on a correlation between the region and the label of each of the one or more objects in each of the set of images, and the context of each of the one or more objects in each of the set of images; and
    correcting, by the image processing device, the orientation of the input image based on the estimated orientation score for each of the set of images.

2. The method of claim 1, wherein each of the set of images of the environment is oriented in a different orientation with respect to remaining of the set of images.

3. The method of claim 1, wherein the object detection and labelling model employs a convolution neural network based machine learning model.

4. The method of claim 1, further comprising building the object detection and labelling model using training image data, wherein the training image data comprises a plurality of training images, one or more marked regions corresponding to one or more objects in each of the plurality of training images, and one or more labels corresponding to the one or more objects in each of the plurality of training images.

5. The method of claim 1, further comprising filtering one or more inconsistent objects from among the one or more objects in the set of images; wherein inconsistent objects are objects that are not consistent across the set of images.

6. The method of claim 1, wherein the context generation model employs a deep learning based machine learning model to associate a region and a label corresponding to an object to a textual description corresponding to that object.

7. The method of claim 1, further comprising building the context generation model using training image data, wherein the training image data comprises a plurality of training images and a textual description for one or more objects in each of the plurality of training images.

8. The method of claim 1, wherein the orientation score of an object is based on an orientation and a region of the object in an image with respect to orientations and regions of other objects in the image and an overall context of the environment.

9. The method of claim 1, wherein correcting the orientation of the input image comprises determining one or more images from the set of images having substantially correct orientations based on the estimated orientation score for each of the set of images, and wherein a substantially correct orientation corresponds to a highest orientation score from among the orientation score for each of the set of images.

10. The method of claim 9, wherein correcting the orientation of the input image further comprises at least one of transforming or rotating the one or more images.

11. A system for correcting an orientation of an input image, the system comprising:
    an image processing device comprising at least one processor and a computer-readable medium storing instructions that, when executed by the at least one processor, cause the at least one processor to perform operations comprising:
        generating a set of images of an environment corresponding to the input image;
        determining a region and a label corresponding to each of one or more objects in each of the set of images using an object detection and labelling model;
        determining a context for each of the one or more objects in each of the set of images with respect to an overall context of the environment, using a context generation model, based on the label for each of the one or more objects;
        estimating an orientation score for each of the set of images based on a correlation between the region and the label of each of the one or more objects in each of the set of images, and the context of each of the one or more objects in each of the set of images; and
        correcting the orientation of the input image based on the estimated orientation score for each of the set of images.

12. The system of claim 11, wherein each of the set of images of the environment is oriented in a different orientation with respect to remaining of the set of images.

13. The system of claim 11, wherein the object detection and labelling model employs a convolution neural network based machine learning model.

14. The system of claim 11, wherein the operations further comprise building the object detection and labelling model using training image data, wherein the training image data comprises a plurality of training images, one or more marked regions corresponding to one or more objects in each of the plurality of training images, and one or more labels corresponding to the one or more objects in each of the plurality of training images.

15. The system of claim 11, wherein the operations further comprise filtering one or more inconsistent objects from among the one or more objects in the set of images, wherein inconsistent objects are objects that are not consistent across the set of images.

16. The system of claim 11, wherein the context generation model employs a deep learning based machine learning model to associate a region and a label corresponding to an object to a textual description corresponding to that object.

17. The system of claim 11, wherein the operations further comprise building the context generation model using training image data, wherein the training image data comprises a plurality of training images and a textual description for one or more objects in each of the plurality of training images.

18. The system of claim 11, wherein the orientation score of an object is based on an orientation and a region of the object in an image with respect to orientations and regions of other objects in the image and an overall context of the environment.

19. The system of claim 11, wherein correcting the orientation of the input image comprises:
   determining one or more images from the set of images having substantially correct orientations based on the estimated orientation score for each of the set of images, wherein a substantially correct orientation corresponds to a highest orientation score from among the orientation score for each of the set of images; and
   performing at least one of transformation or rotation of the one or more images.

20. A non-transitory computer-readable medium storing computer-executable instructions for:
   generating a set of images of an environment corresponding to an input image;
   determining a region and a label corresponding to each of one or more objects in each of the set of images using an object detection and labelling model;
   determining a context for each of the one or more objects in each of the set of images with respect to an overall context of the environment, using a context generation model, based on the label for each of the one or more objects;
   estimating an orientation score for each of the set of images based on a correlation between the region and the label of each of the one or more objects in each of the set of images, and the context of each of the one or more objects in each of the set of images; and
   correcting an orientation of the input image based on the estimated orientation score for each of the set of images.

* * * * *